United States Patent
Ryu et al.

(10) Patent No.: US 8,802,285 B2
(45) Date of Patent: Aug. 12, 2014

(54) ORGANIC ELECTROLYTIC SOLUTION COMPRISING CYCLOOLEFIN MONOMER AND LITHIUM BATTERY EMPLOYING THE SAME

(75) Inventors: Young-gyoon Ryu, Suwon-si (KR); Yoon-sok Kang, Seongnam-si (KR); Dong-joon Lee, Seoul (KR); Seok-soo Lee, Suwon-si (KR); Seung-sik Hwang, Seongnam-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1140 days.

(21) Appl. No.: 12/204,045

(22) Filed: Sep. 4, 2008

(65) Prior Publication Data
US 2009/0191464 A1 Jul. 30, 2009

(30) Foreign Application Priority Data
Jan. 30, 2008 (KR) .......................... 10-2008-0009676

(51) Int. Cl.
*H01M 6/04* (2006.01)

(52) U.S. Cl.
USPC .......................................... 429/189; 429/324

(58) Field of Classification Search
USPC .................................................. 429/189, 324
See application file for complete search history.

(56) References Cited

FOREIGN PATENT DOCUMENTS

| JP | 2002-36459 | * | 2/2002 |
| JP | 2007-184227 | * | 7/2007 |

OTHER PUBLICATIONS

Katsumata et al. "Polyacetylene and polynorbornene derivatives carrying TEMPO. Synthesis and properties as organic radical battery materials", Macromolecular Rapid Communications (2006), 27 (15), pp. 1206-1211.*

* cited by examiner

*Primary Examiner* — Laura Weiner
(74) *Attorney, Agent, or Firm* — Lee & Morse, P.C.

(57) ABSTRACT

An organic electrolytic solution includes a lithium salt; an organic solvent containing a high dielectric constant solvent; and a polymerizable cycloolefin monomer, and an lithium battery employing the same. The organic electrolytic solution prevents decomposition of an electrolyte, and thus the lithium battery employing the organic electrolytic solution has improved cycle characteristics and lifetime.

2 Claims, 4 Drawing Sheets

ORGANIC ELECTROLYTIC SOLUTION COMPRISING CYCLOOLEFIN MONOMER AND LITHIUM BATTERY EMPLOYING THE SAME

CROSS-REFERENCE TO RELATED PATENT APPLICATION

This application claims the benefit of Korean Patent Application No. 2008-9676, filed on Jan. 30, 2008, in the Korean Intellectual Property Office, the disclosure of which is incorporated herein in its entirety by reference.

BACKGROUND OF THE INVENTION

1. Field of the Invention

Aspects of the present invention relate to an organic electrolytic solution comprising a cycloolefin monomer and a lithium battery employing the same, and more particularly, to an organic electrolytic solution comprising a cycloolefin monomer that can be polymerized to form a polymer film that can prevent decomposition of an electrolyte and a lithium battery with improved cycle and lifetime characteristics by employing the organic electrolytic solution.

2. Description of the Related Art

As portable electronic devices, such as video cameras, cellular phones, notebook computers, and the like become more lightweight and are of increasingly higher performance, more research into batteries used as power supplies for such portable devices is being conducted. In particular, chargeable lithium secondary batteries have three times the energy density per unit weight than conventional lead storage batteries, nickel-cadmium batteries, nickel-hydrogen batteries, nickel-zinc batteries, and the like, and can be rapidly charged. Therefore, research and development of chargeable lithium secondary batteries is being actively conducted.

A lithium battery is generally driven at a high operating voltage, and thus a conventional aqueous electrolytic solution cannot be used. This is because lithium contained in an anode reacts vigorously with an aqueous solution. Thus, instead of an aqueous electrolytic solution, an organic electrolytic solution in which a lithium salt is dissolved in an organic solvent is used in the lithium battery. In this case, organic solvents having a high ionic conductivity and dielectric constant and a low viscosity may be used. Since it is difficult to obtain a single organic solvent satisfying all these requirements, a solvent including a mixture of an organic solvent having a high dielectric constant with an organic solvent having a low viscosity, or the like are generally used.

When a lithium secondary battery uses a carbonate-based polar non-aqueous solvent, a reaction of an anode with an electrolytic solution requires excess charges during initial charging. As a result of such an irreversible reaction, a passivation layer, such as a solid electrolyte interface (SEI) membrane, is formed on the surface of an anode. The SEI membrane allows the battery to be stably charged and discharged without further decomposition of the electrolytic solution. In addition, the SEI membrane acts as an ion tunnel through which only lithium ions pass and prevents co-intercalation of an organic solvent, which solvates lithium ions and moves with the lithium ions, into an anode, thereby preventing a breakdown of the anode structure.

However, as the lithium battery is repeatedly charged and discharged at a high voltage of 4 V or more, the SEI membrane gradually cracks due to expansion and contraction of an active material, which occurs during the charging and discharging, and becomes detached from the surface of the electrode. Thus, as shown in FIG. 1, an electrolyte directly contacts the active material, resulting in continuous decomposition of the electrolyte. In addition, once the crack of the SEI membrane occurs, the crack progresses due to the charging and discharging of the lithium battery, resulting in degradation of the active material. As a result, the SEI membrane formed of only a polar solvent and a lithium salt cannot retain the ideal properties described above. Accordingly, the internal resistance of the anode increases, and consequently, the capacity of the battery decreases. In addition, due to decomposition of the solvent, the amount of the electrolyte is reduced. Thus, the electrolyte in the battery becomes depleted, so that it is difficult to obtain sufficient ion transfer.

To address these and/or other problems, there is still a desire to develop a method of preventing direct contact between an anode active material and an electrolyte while not allowing degradation of conducting properties of lithium ions, thereby improving charge and discharge characteristics of a battery.

SUMMARY OF THE INVENTION

Aspects of the present invention provide an organic electrolytic solution that prevents direct contact between an anode active material and an electrolyte while not inducing deterioration of the conducting properties of lithium ions.

Aspects of the present invention also provide a lithium battery with improved cycle and lifetime characteristics by employing the organic electrolytic solution.

According to an embodiment of the present invention, there is provided an organic electrolytic solution comprising: a lithium salt; an organic solvent containing a high dielectric constant solvent; and a polymerizable cycloolefin monomer.

According to another embodiment of the present invention, there is provided a lithium battery comprising: the organic electrolytic solution; a cathode; and an anode, wherein the anode comprises a catalyst for facilitating polymerization of a polymerizable cycloolefin monomer in the organic electrolytic solution by inducing a ring-opening reaction thereof.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
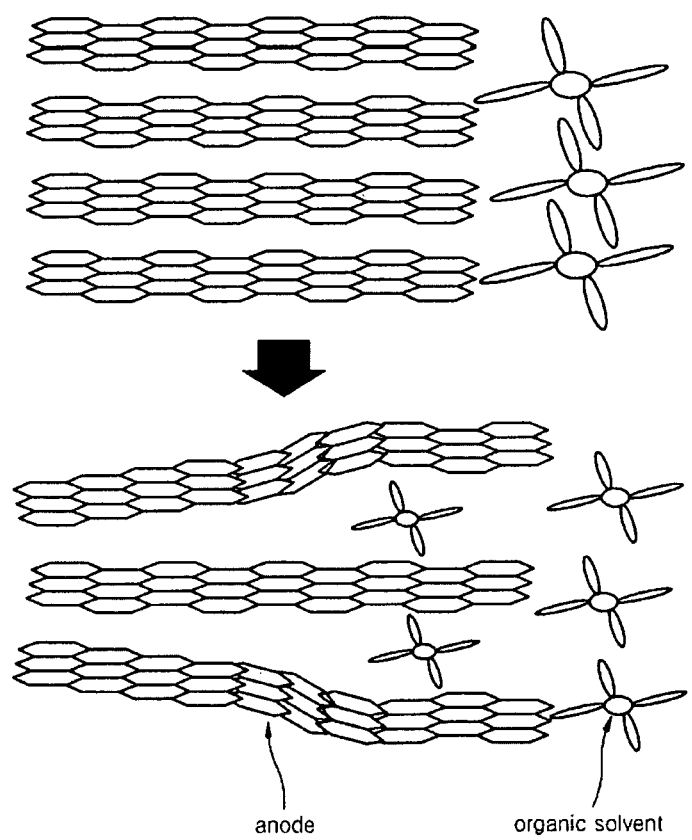
FIG. 1 is a schematic diagram illustrating co-intercalation of a conventional electrolyte.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention provide an organic electrolytic solution including: a lithium salt; an organic solvent containing a high dielectric constant solvent; and a polymerizable cycloolefin monomer.

According to an embodiment of the present invention, the polymerizable cycloolefin monomer may be a norbornene-based compound represented by Formula 1 below:

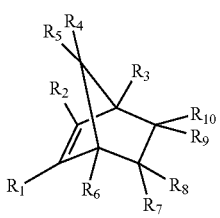

<Formula 1> wherein $R_1$, $R_2$, $R_3$, $R_4$, $R_5$, $R_6$, $R_7$, $R_8$, $R_9$, and $R_{10}$ are each independently a hydrogen atom, a halogen atom, a hydroxyl group, a carboxyl group, an amino group, a cyano group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, a substituted or unsubstituted $C_{4-30}$ heteroaryl group, a $C_{7-30}$ arylcarbonyl group, a $C_{2-20}$ alkyloxycarbonyl group, a $C_{2-20}$ alkylcarbonyl group, or a $C_{2-20}$ alkylcarbonyloxy group.

$R_4$ and $R_5$ together may represent =O. That is, instead of $R_4$ and $R_5$ representing two different substituents bound to a carbon of the norbornene-based compound, $R_4$ and $R_5$ together may represent an oxygen atom that is doubly bonded to the carbon. $R_7$ and $R_9$ may be bound to each other to form, together with the carbon atoms to which $R_7$ and $R_9$ are bound, a five-membered ring or six-membered ring structure, or a hetero cyclic structure. $R_8$ and $R_{10}$ together may represent a single bond. That is, $R_8$ and $R_{10}$ together may represent an additional bond between the carbons to which $R_9$ and $R_7$ are attached in addition to the bond already shown in Formula 1, thereby providing a double bond between these carbons.

The compound of Formula 1 where $R_7$ and $R_9$ are bound to each other to form the ring structure may be a dicyclopentadiene-based compound represented by Formula 2 below:

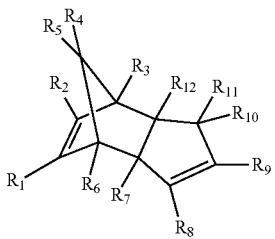

<Formula 2> wherein $R_1$, $R_2$, $R_3$, $R_4$, $R_5$, $R_6$, $R_7$, $R_8$, $R_9$, $R_{10}$, $R_{11}$, and $R_{12}$ are each independently a hydrogen atom, a halogen atom, a hydroxyl group, a carboxyl group, an amino group, a cyano group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, or a substituted or unsubstituted $C_{4-30}$ heteroaryl group, $R_4$ and $R_5$ together may represent =O, and $R_{10}$ and $R_{11}$ together may represent =O.

According to another embodiment of the present invention, the norbornene-based compound of Formula 1 may be at least one compound selected from the group consisting of norbornene represented by Formula 3 below, 2-benzoyl-5-norbornene represented by Formula 4 below, 5-norbornene-2-carboxylate represented by Formula 5 below, 2-acetyl-5-norbornene represented by Formula 6 below, 5-norbornene-2-yl acetate represented by Formula 7 below, cis-5-norbornene-exo-2,3-dicarboxylic acid anhydride represented by Formula 8 below, and dimethyl exo-tricyclo(4.2.1.0(2.5) nona-3,7-dienen-3,4-dicarboxylate represented by Formula 9 below.

<Formula 3>

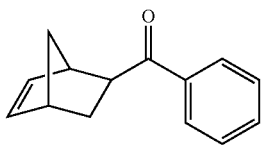

<Formula 4>

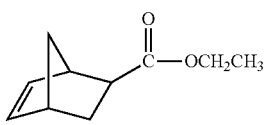

<Formula 5>

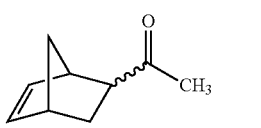

<Formula 6>

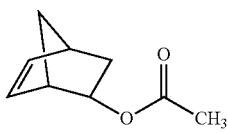

<Formula 7>

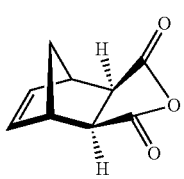

<Formula 8>

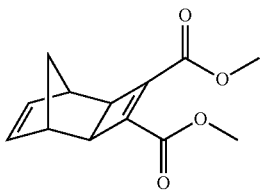
<Formula 9>

According to another embodiment of the present invention, the dicyclopentadiene-based compound of Formula 2 may be at least one compound selected from the group consisting of dicyclopentadiene represented by Formula 10 below, 3a,4,7,7a-tetrahydro-4,7-methano-indene-1,8-dione represented by Formula 11 below, and methyl dicyclopentadiene dimer represented by Formula 12 below:

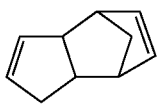
<Formula 10>

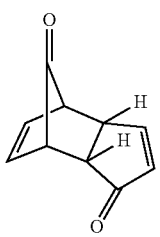
<Formula 11>

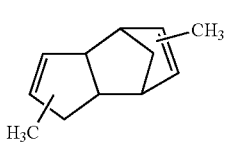
<Formula 12>

In an operation mechanism according to aspects of the present invention, a polymerizable cycloolefin monomer, such as a monomer of Formula 1 through 12, is decomposed using a ring opening reaction, and then the decomposed polymerizable cycloolefin monomer is polymerized with an adjacent decomposed polymerizable cycloolefin monomer to form a polymer film on, for example, a surface of an electrode. The polymer film is adsorbed onto the surface of the electrode to prevent a contact between an electrolyte and an organic solvent. Thus, this prevents an irreversible degradation of the electrode from occurring at an interface between the electrode and electrolyte. Due to such an operation mechanism, a polymer film that is uniform and stable is formed on the surface of the electrode, and thus when used in a lithium battery, the initial efficiency and cycle efficiency thereof are improved, resulting in an improvement of general characteristics of the lithium battery.

Figure 2:
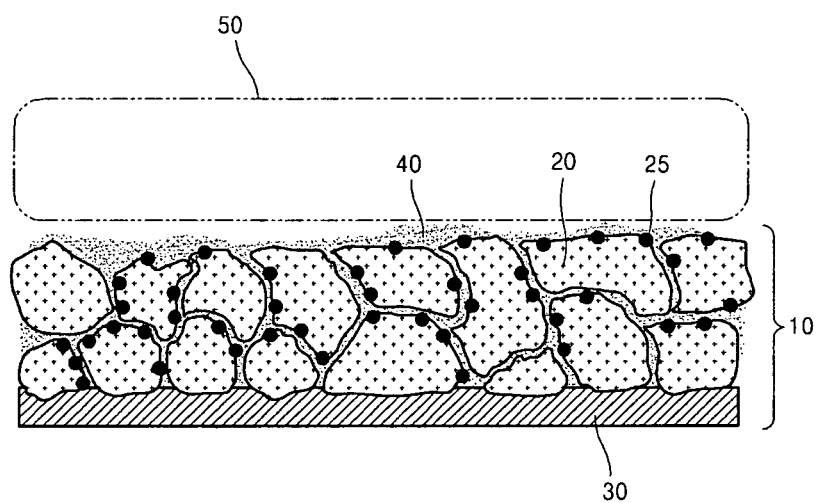
FIG. 2 is a schematic diagram illustrating an electrode of a lithium battery including a polymer film of an organic electrolytic solution according to an embodiment of the present invention.

According to an embodiment of the present invention, a catalyst that facilitates the ring opening reaction of the polymerizable cycloolefin monomer may be provided. The catalyst may be provided on an active material when an electrode is formed. The catalyst catalyzes the forming of the polymer film on the surface of the active material for the electrode. The catalyst may be any catalyst that can facilitate the ring opening reaction of the polymerizable cycloolefin monomer, such as, for example, a Grubbs catalyst. The electrode may be an anode or a cathode. FIG. 2 is a schematic representation of an electrode 10 as described above. In particular, as shown in FIG. 2, an active material 20 including catalyst particles 25 is provided on a substrate 30. A polymer film 40, comprising the polymerization resultant obtained by the ring-opening and polymerization of the cycloolefin monomer, coats the particles of the active material 20 and provides a barrier to contact between the active material 20 and the electrolyte 50.

A polymerization resultant obtained by ring-opening the norbornene-based compound of Formula 1 may be a compound represented by Formula 13 below, and a polymerization resultant obtained by ring-opening the dicyclopentadiene-based compound of Formula 2 may be a compound represented by Formula 14 below:

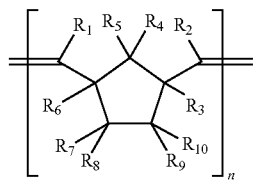
<Formula 13> wherein $R_1$, $R_2$, $R_3$, $R_4$, $R_5$, $R_6$, $R_7$, $R_8$, $R_9$, and $R_{10}$ are the same as defined above, and n is an integer of from 1 to 100,000,

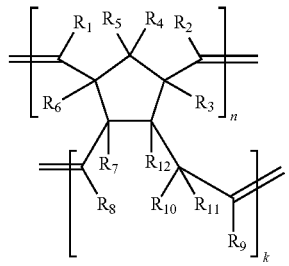
<Formula 14> wherein $R_1$, $R_2$, $R_3$, $R_4$, $R_5$, $R_6$, $R_7$, $R_8$, $R_9$, $R_{10}$, $R_{11}$, and $R_{12}$ are the same as defined above, n is an integer of from 1 to 100,000, and k is an integer of from 1 to 100,000.

The term "$C_{1-20}$ alkyl group" as used herein refers to a straight or branched alkyl group having one to twenty carbon atoms. As more specific, non-limiting examples, substituent defined herein as a $C_{1-20}$ alkyl group may be a $C_{1-12}$, $C_{1-8}$ or $C_{1-4}$ alkyl group. Examples of the $C_{1-20}$ alkyl group include methyl, ethyl, propyl, isobutyl, sec-butyl, tert-butyl, pentyl, iso-amyl, hexyl, and the like. The $C_{1-20}$ alkyl group may be unsubstituted, or at least one hydrogen atom of the alkyl group may be substituted with a halogen atom, a hydroxyl group, a nitro group, a cyano group, or the like.

The term "$C_{1-20}$ alkoxy group" as used herein refers to a substituent having an —O-alkyl structure, wherein the oxygen atom is bound to a main chain of a $C_{1-20}$ alkyl group as described above. As more specific examples, the $C_{1-20}$ alkoxy group may be a $C_{1-12}$, a $C_{1-8}$ or $C_{1-4}$ alkoxy group. Examples of the $C_{1-20}$ alkoxy group include methoxy, ethoxy, propoxy, or the like. The $C_{1-20}$ alkoxy group may be unsubstituted or at least one hydrogen atom of the alkoxy group may be substituted with a halogen atom, a hydroxyl group, a nitro group, a cyano group, or the like.

The term "$C_{2-20}$ alkenyl group" as used herein refers to a straight or branched alkenyl group having 2 to 20 carbon atoms. In particular, the $C_{2-20}$ alkenyl group may be an alkyl group as described above containing at least one unsaturated double bond. The $C_{2-20}$ alkenyl group may be unsubstituted, or at least one hydrogen atom of the alkenyl group may be substituted with a halogen atom, a hydroxyl group, a nitro group, a cyano group, or the like.

The term "$C_{2-20}$ alkynyl group" as used herein refers to a straight or branched alkynyl group having two to twenty carbon atoms. In particular, the $C_{2-20}$ alkynyl group may be an alkyl group as describe above containing at least one unsaturated triple bond. The $C_{2-20}$ alkenyl group may be unsubstituted or at least one hydrogen atom of the alkynyl group may be substituted with a halogen atom, a hydroxyl group, a nitro group, a cyano group, or the like.

The term "$C_{6-30}$ aryl group" as used herein refers to a carbocyclic aromatic system containing six to 30 carbon atoms and at least one aromatic ring. As more specific, non-limiting examples, the $C_{6-30}$ aryl group may be a $C_{6-20}$ or a $C_{6-10}$ aryl group. Where more than one ring is included in the $C_{6-30}$ aryl group, the aromatic rings may be attached to each other pendantly or may be fused with each other. The $C_{6-30}$ aryl group may be unsubstituted, or at least one hydrogen atom of the aryl group may be substituted with a halogen atom, a hydroxyl group, a nitro group, a cyano group, or the like. Examples of the aryl group may include a phenyl group, a halophenyl group (such as, for example, an o-, m- or p-fluorophenyl group or a dichlorophenyl group), a cyanophenyl group, a dicyanophenyl group, a trifluoromethoxyphenyl group, a biphenyl group, a halobiphenyl group, a cyanobiphenyl group, a $C_1$-$C_{10}$ biphenyl group, a $C_1$-$C_{10}$ alkoxybiphenyl group, an o-, m- and p-tolyl group, an o-, m- and p-cumenyl group, a mesityl group, a phenoxyphenyl group, an (α,α-dimethylbenzene)phenyl group, a (N,N'-dimethyl)aminophenyl group, a (N,N'-diphenyl)aminophenyl group, a pentalenyl group, an indenyl group, a naphthyl group, a halonaphthyl group (such as, for example, a fluoronaphthyl group), a $C_1$-$C_{10}$ alkylnaphthyl group (such as, for example, a methylnaphthyl group), a $C_1$-$C_{10}$ alkoxynaphthyl group (such as, for example, a methoxynaphthyl group), a cyanonaphthyl group, an anthracenyl group, an azulenyl group, a heptalenyl group, an acenaphthylenyl group, a phenalenyl group, a fluorenyl group, an anthraquinolyl group, a methylanthryl group, a phenanthryl group, a triphenylene group, a pyrenyl group, a chrysenyl group, an ethyl-chrysenyl group, a picenyl group, a perylenyl group, a chloroperylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyranthrenyl group, an ovalenyl group, or the like.

The term "$C_{7-30}$ alkylaryl group" as used herein refers to a group in which at least one hydrogen atom of an aryl group defined above is substituted with an alkyl group. Examples of the $C_{7-30}$ alkylaryl group may include a benzyl group, and the like. However, the present invention is not limited to these examples. The $C_{7-30}$ alkylaryl group may be unsubstituted, or at least one hydrogen atom of the alkylaryl group may be substituted with a halogen atom, a hydroxyl group, a nitro group, a cyano group, or the like.

The term "$C_{7-30}$ arylalkyl group" as used herein refers to a group in which at least one hydrogen atom of an alkyl group defined above is substituted with an aryl group. Examples of the $C_{7-30}$ arylalkyl group include a 4-tert-butylphenyl group, 4-ethylphenyl group, and the like. However, the present invention is not limited to these examples. The $C_{7-30}$ arylalkyl group may be unsubstituted, or at least one hydrogen atom of the arylalkyl group may be substituted with a halogen atom, a hydroxyl group, a nitro group, a cyano group, or the like.

The term "$C_{1-20}$ heteroalkyl group" as used herein refers to a group in which a hetero atom such as an oxygen atom, a nitrogen atom, a sulfur atom, a phosphorus atom, or the like is contained in a main chain of an alkyl group defined above. The $C_{1-20}$ heteroalkyl group may be unsubstituted, or at least one hydrogen atom of the heteroalkyl group may be substituted with a halogen atom, a hydroxyl group, a nitro group, a cyano group, or the like.

The term "$C_{4-30}$ heteroaryl group" as used herein refers to an aromatic ring system that includes at least one hetero atom selected from an oxygen atom, a nitrogen atom, a sulfur atom and a phosphorus atom. If more than one ring is included in the aromatic ring system, the rings may be fused with each other, or bound to each other by a single bond, or the like. The $C_{4-30}$ heteroaryl group may be unsubstituted, or at least one hydrogen atom of the heteroaryl group may be substituted with a halogen atom, a hydroxyl group, a nitro group, a cyano group, or the like.

The term "arylcarbonyl group" as used herein refers to a substituent having an aryl-C(=O)— structure, wherein the aryl group is the same as defined above.

The term "alkyloxycarbonyl group" as used herein refers to a substituent having an alkyl-O—(C=O)— structure, wherein the alkyl group is the same as defined above.

The term "alkylcarbonyl group" as used herein refers to a substituent having an alkyl-(C=O)— structure, wherein the alkyl group is the same as defined above.

The term "alkylcarbonyloxy group" as used herein refers to a substituent having an alkyl-(C=O)—O— structure, wherein the alkyl group is the same as defined above.

In the organic electrolytic solution, the amount of the polymerizable cycloolefin monomer may be in a range of 0.5 to 10 parts by weight, or more specifically, in a range of 1 to 5 parts by weight based on 100 parts by weight of the organic solvent containing a high dielectric constant solvent. When the amount of the polymerizable cycloolefin monomer is less than 0.5 parts by weight, charge-discharge characteristics may not be improved sufficiently. On the other hand, when the amount of the polymerizable cycloolefin monomer is greater than 10 parts by weight, unreacted cycloolefin monomer remains in the organic electrolytic solution, and thus, the viscosity of the organic electrolytic solution becomes high, resulting in a reduction in ionic conductivity.

The organic solvent included in the organic electrolytic solution may be any high dielectric constant solvent that is commonly used in the art. Examples of the organic solvent include a ring carbonate such as ethylene carbonate, propylene carbonate, and butylene carbonate, γ-butyrolactone, and the like. As a specific, non-limiting example, the organic solvent may be propylene carbonate, which provides high voltage stability.

The organic solvent may further include a low boiling point solvent in addition to the high dielectric constant solvent described above. The low boiling point solvent may be any low boiling point solvent that is commonly used in the art such as, for example, a chain carbonate such as dimethyl carbonate, ethylmethyl carbonate, diethyl carbonate, or dipropyl carbonate, dimethoxyethane, diethoxyethane, or a fatty acid ester derivative.

The mixing volume ratio of the high dielectric constant solvent to the low boiling point solvent may be in a range of 1:1 to 1:9. When the ratio is outside of this range, the discharge capacity and charge/discharge lifetime of the battery may be degraded.

In addition, the lithium salt included in the organic electrolytic solution may be any lithium salt that is commonly used in a lithium battery and may include at least one compound selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$. The concentration of the lithium salt in the organic electrolytic solution may be in a range of 0.5 to 2 M. When the concentration of the lithium salt is less than 0.5 M, the conductivity of the electrolytic solution is low, and thus the performance of the electrolytic solution is degraded. When the concentration of the lithium salt is greater than 2.0

M, the viscosity of the electrolytic solution increases, and thus the mobility of lithium ions is reduced.

As a specific, non-limiting example, the organic electrolytic solution according to aspects of the present invention may comprise $LiPF_6$ as the lithium salt, a mixed solvent of ethylene carbonate, diethyl carbonate and fluoroethylene carbonate in a volume ratio of 2:6:2 as the organic solvent, and a dicyclopentadiene-based compound as the polymerizable cycloolefin monomer.

Hereinafter, a lithium battery employing the organic electrolytic solution and a method of manufacturing the same will be described.

Aspects of the present invention also provide a lithium battery including a cathode, an anode, and an organic electrolytic solution, wherein the organic electrolytic solution includes a lithium salt, an organic solvent containing a high dielectric constant solvent, and the polymerizable cycloolefin monomer as described above. The type of the lithium battery is not particularly limited. The lithium battery can be a secondary lithium battery, such as a lithium ion battery, a lithium ion polymer battery, a lithium sulfur battery, or the like, or a primary lithium battery.

A method of manufacturing the lithium battery according to aspects of the present invention will now be described.

First, a cathode active material, a conductive agent, a binder, and a solvent are mixed to prepare a cathode active material composition. The cathode active material composition may be directly coated onto an aluminum current collector and then dried to prepare a cathode plate. Alternatively, the cathode active material composition may be cast onto a separate support, and then the film may be separated from the support. The separated film is laminated on an aluminum current collector to prepare a cathode plate.

The cathode active material is not limited and can be any lithium-containing metal oxide that is commonly used in the art. Examples of the cathode active material include $LiCoO_2$, $LiMn_xO_{2x}$, $LiNi_{x-1}Mn_xO_{2x}$ where x=1, 2, $Li_{1-x-y}Co_xMn_yO_2$ where 0≤x≤0.5 and 0≤y≤0.5, and the like.

The conductive agent may be carbon black. The binder may be a vinylidene fluoride/hexafluoropropylene copolymer; polyvinylidenefluoride (PVDF), poly acrylonitrile, polymethylmethacrylate, polytetrafluoroethylene, or a mixture thereof; or a styrene butadiene rubber based polymer. The solvent may be N-methylpyrrolidone (NMP), acetone, water, or the like. The amounts of the cathode active material, the conducting agent, the binder and the solvent are those commonly used in a lithium battery.

Similarly, an anode active material, a conducting agent, a binder, a solvent, and a catalyst for facilitating the ring-opening reaction of the polymerizable cycloolefin monomer are mixed to prepare an anode active material composition. The anode active material composition is directly coated onto a Cu current collector, or is cast onto a separate support and an anode active material film separated from the support is laminated on a Cu current collector to obtain an anode plate. The amounts of the anode active material, the conducting agent, the binder and the solvent are those commonly used in a lithium battery.

The catalyst in the anode plate may vary depending on the required capacity of the anode. As a non-limiting example, the weight ratio of the catalyst to the anode plate may be in a range of 5:1 to 30:1.

The anode active material may be silicon metal, a silicon thin film, lithium metal, a lithium alloy, a carbonaceous material, or graphite. The conducting agent, the binder and the solvent of the anode active material composition may be the same as those of the cathode active material composition. If desired, the cathode active material composition and the anode active material composition may further include a plasticizer to form pores in the electrode plates.

The separator may be any separator that is commonly used in a lithium battery. In particular, the a separator having a low resistance to movement of ions of an electrolyte and excellent electrolytic solution retaining properties is desirable. Examples of the separator include glass fiber, polyester, TEFLON, polyethylene, polypropylene, polytetrafluoroethylene (PTFE), or a combination thereof. The separator may be a nonwoven fabric or a woven fabric. In more detail, a lithium ion battery uses a foldable separator formed of polyethylene or polypropylene, and a lithium ion polymer battery uses a separator having an excellent organic electrolytic solution retaining capability. A method of manufacturing the separator will now be described in detail.

A polymer resin, a filler and a solvent are mixed to prepare a separator composition. The separator composition is directly coated onto an electrode and dried to form a separator film. Alternatively, the separator composition may be cast onto a support and dried, and then a separator film formed on the support may be peeled off and laminated on an electrode.

The polymer resin is not particularly limited and may be any material that is used in a conventional binder for an electrode plate. Examples of the polymer resin include vinylidenefluoride/hexafluoropropylene copolymer, polyvinylidenefluoride, polyacrylonitrile, polymethylmethacrylate and a mixture thereof. In particular, a vinylidenefluoride/hexafluoropropylene copolymer containing 8 to 25% by weight of hexafluoropropylene may be used.

The separator is interposed between the cathode plate and the anode plate to form a battery assembly. The battery assembly is wound or folded and placed in a cylindrical or rectangular battery case. Then, the organic electrolytic solution according to an embodiment of the present invention is injected into the battery case to complete the manufacture of a lithium ion battery.

In addition, the battery assembly may be prepared in the form of a bi-cell and may be impregnated in the organic electrolytic solution according to an embodiment of the present invention. Then, the resultant is placed in a pouch and sealed to complete a lithium ion polymer battery.

Aspects of the present invention will be described in further detail with reference to the following examples. These examples are for illustrative purposes only and are not intended to limit the scope of the present invention.

EXAMPLE 1

2 wt % of dicyclopentadiene as an additive was added to an organic solvent prepared by mixing ethylene carbonate, diethyl carbonate and fluoroethylene carbonate in a volume ratio of 2:6:2, and 1.3 M of $LiPF_6$ as a lithium salt was added to the mixture to prepare an organic electrolytic solution.

Next, an anode material was prepared in the following manner: 1 g of silicon powder having an average particle diameter of 0.1 μm (Nano Structured and Amorphous Materials Inc.) and 2 g of graphite powder having an average particle diameter of 6 μm (mesocarbon microbeads; manufactured by Osaka gas Chemicals Company) were mixed together in a mortar, the mixture was placed into a milling vessel made of stainless steel together with 20 g of steel balls, and then the resultant was mechanically milled using a SPEX mill 8000 M for 1 hour. The anode was then prepared as follows: the silicon/graphite complex, a Grubbs catalyst II ($2^{nd}$ Generation Grubbs Catalyst), carbon black as a conducting agent and carboxyl methyl cellulose (CMC) as a binder were mixed in a weight ratio of 62:20:15:3 in a mortar, water was added to the mixture to prepare a slurry, the resultant was coated onto a Cu foil having a thickness of 20 μm, and dried at 100° C., and the resultant was dried in vacuum at 120° C. for 3 hours. The anode, a lithium metal as a counter electrode, a polyethylene separator, and the organic electrolytic solution were used to manufacture a 2016 coin cell.

COMPARATIVE EXAMPLE 1

A coin cell was manufactured in the same manner as in Example 1, except that in the preparation of the organic electrolytic solution, dicyclopentadiene as the additive was not added and the Grubbs catalyst II was not used in the anode.

EXPERIMENTAL EXAMPLE 1

Charge/Discharge Characteristics Test of Batteries

The coin cells manufactured in Example 1 and Comparative Example 1 had a cell capacity of 1.16 mAh and 1.93 mAh, respectively. The coin cells were then each charged with a constant current at a rate of 0.1 C until the voltage of the corresponding cell reached 0.001 V against an Li electrode. Then, the coin cells were each charged with a constant voltage of 0.001 V until the current charging of the cell reached a rate of 0.02 C per second with respect to the cell capacity. Then, the coin cells were each discharged with a constant current at a rate of 0.1 C per second with respect to the cell capacity until the voltage of the cell reached 1.5 V to obtain charge and discharge capacities. The charge and discharge capacities are represented as the capacity per unit weight of an active material. Initial charge and discharge efficiencies of the coin cells were calculated therefrom. The initial charge-discharge efficiencies of the coin cells are represented by Equation 1 below.

Initial charge-discharge efficiency (%)=1$^{st}$ cycle discharge capacity/1$^{st}$ cycle charge capacity     (1)

The results are shown in Table 1 below and FIG. 2.

TABLE 1

| | 1$^{st}$ cycle | | |
|---|---|---|---|
| | Charge capacity (mAh/g) | Discharge capacity (mAh/g) | Initial charge/discharge efficiency (%) |
| Example 1 | 1507 | 1138 | 75.3 |
| Comparative Example 1 | 1310 | 889 | 67.8 |

In addition, the charge/discharge cycle of the coin cells of Example 1 and the Comparative Example was repeated up to 45 times. The results are shown in FIG. 3.

Figure 3:
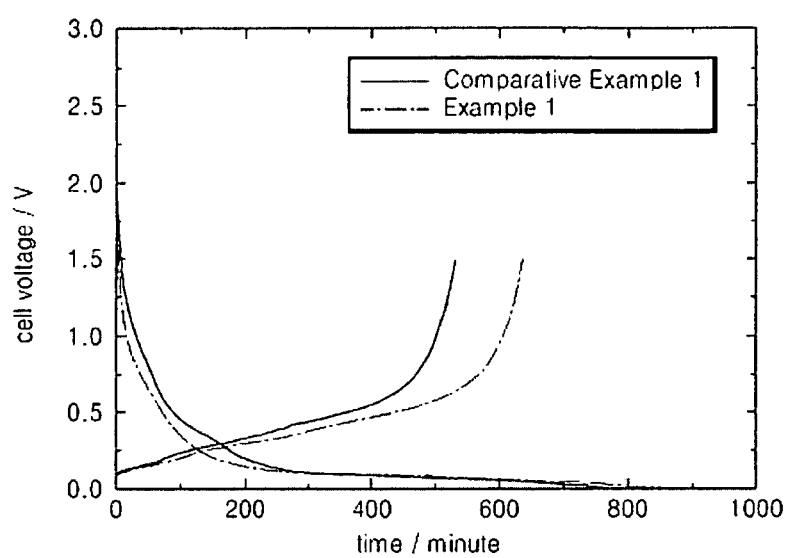
FIG. 3 shows an initial charge-discharge curve of each of the lithium batteries manufactured in Example 1 and Comparative Example 1, respectively.
Figure 4:
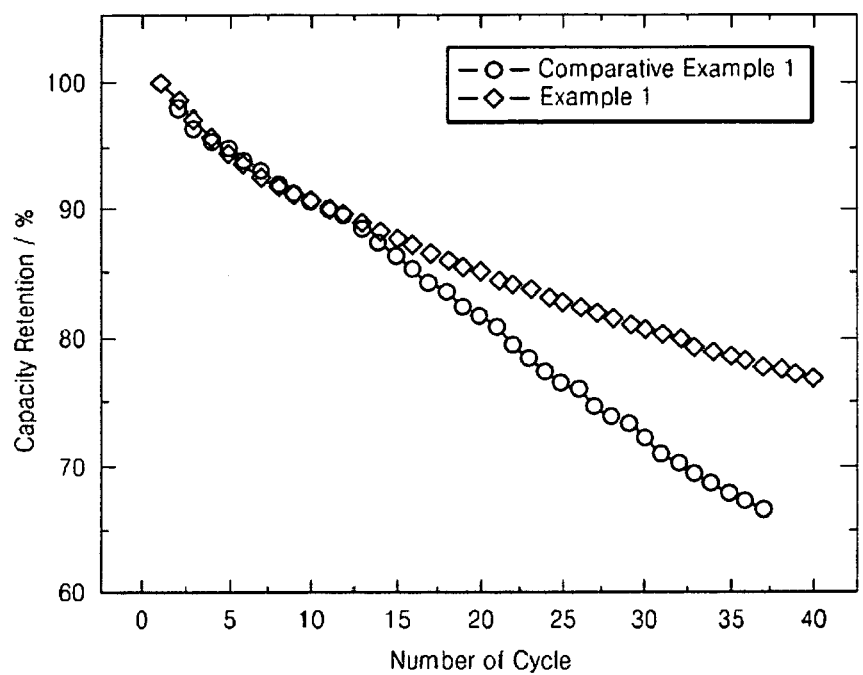
FIG. 4 is a graph showing cycle characteristics of each of the lithium batteries manufactured in Example 1 and Comparative Example 1, respectively.

As can be seen in Table 1 and FIGS. 3 and 4, when the polymerizable cycloolefin monomer was used as an additive, the charge/discharge of the coin cell proceeded reversibly, and the initial charge/discharge efficiency thereof was higher than 70%. In addition, in FIG. 4 showing cycle characteristics of the coin cell of Example 1, it can be seen that the coin cell of Example 1 has excellent capacity retention characteristics even after repetition of 45 cycles.

An organic electrolytic solution according to the above embodiments of the present invention includes a cycloolefin monomer that can be spontaneously decomposed without separate consumption of charges on the surface of an electrode to form a passivation layer, and thus prevents cracks from forming in an anode active material, which conventionally occur during charging and discharging of a battery, thereby providing a battery with excellent cycle characteristics. In addition, the lithium battery employing the organic electrolytic solution, according to the above embodiments of the present invention, can have a high stability, reliability and charge and discharge efficiencies.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium battery, comprising:
   a cathode;
   an anode; and
   an organic electrolytic solution,
   wherein a film is present on a surface of the anode or cathode, the film being a polymerization product of a cycloolefin monomer, wherein the polymerization product of the cycloolefin monomer is a compound represented by Formula 13:

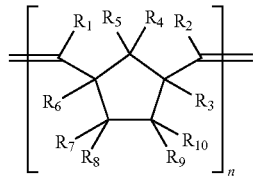

<Formula 13> wherein $R_1$, $R_2$, $R_3$, $R_4$, $R_5$, $R_6$, $R_7$, $R_8$, $R_9$, and $R_{10}$ in Formula 13 are each independently a hydrogen atom, a halogen atom, a hydroxyl group, a carboxyl group, an amino group, a cyano group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, a substituted or unsubstituted $C_{4-30}$ heteroaryl group, a $C_{7-30}$ arylcarbonyl group, a $C_{2-20}$ alkyloxycarbonyl group, a $C_{2-20}$ alkylcarbonyl group, or a $C_{2-20}$ alkylcarbonyloxy group,
wherein $R_4$ and $R_5$ together may also represent =O, $R_7$ and $R_9$ may also be bound to each other to form a five-membered ring or six-membered ring structure, or a hetero cyclic structure, and $R_8$ and $R_{10}$ together may also represent single bond, and
n is an integer of 1 to 100,000.

2. A lithium battery, comprising:
   a cathode;
   an anode; and
   an organic electrolytic solution,
   wherein a film is present on a surface of the anode or cathode, the film being a polymerization product of a cycloolefin monomer, wherein the polymerization product of the cycloolefin monomer is a compound represented by Formula 14:

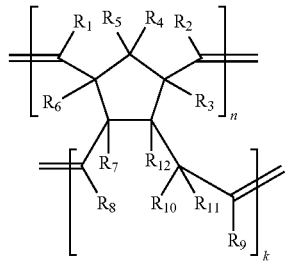

<Formula 14> wherein $R_1$, $R_2$, $R_3$, $R_4$, $R_5$, $R_6$, $R_7$, $R_8$, $R_9$, $R_{10}$, $R_{11}$, and $R_{12}$ in Formula 14 are each independently a hydrogen atom, a halogen atom, a hydroxyl group, a carboxyl group, an amino group, a cyano group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, or a substituted or unsubstituted $C_{4-30}$ heteroaryl group, wherein $R_4$ and $R_5$ together may also represent =O, and $R_{10}$ and $R_{11}$ together may also represent =O, n is an integer of from 1 to 100,000, and k is an integer of from 1 to 100,000.

* * * * *